United States Patent
Ichikawa et al.

(10) Patent No.: US 11,887,837 B2
(45) Date of Patent: Jan. 30, 2024

(54) ULTRAVIOLET LIGHT GENERATION TARGET, METHOD FOR MANUFACTURING ULTRAVIOLET LIGHT GENERATION TARGET, AND ELECTRON-BEAM-EXCITED ULTRAVIOLET LIGHT SOURCE

(71) Applicant: HAMAMATSU PHOTONICS K.K., Hamamatsu (JP)

(72) Inventors: Norio Ichikawa, Hamamatsu (JP); Kohei Ikeda, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 424 days.

(21) Appl. No.: 17/296,294

(22) PCT Filed: Dec. 13, 2019

(86) PCT No.: PCT/JP2019/049006
§ 371 (c)(1),
(2) Date: May 24, 2021

(87) PCT Pub. No.: WO2020/129856
PCT Pub. Date: Jun. 25, 2020

(65) Prior Publication Data
US 2022/0013351 A1   Jan. 13, 2022

(30) Foreign Application Priority Data
Dec. 17, 2018 (JP) .................................. 2018-235288

(51) Int. Cl.
*H01J 63/06* (2006.01)
*G01J 1/42* (2006.01)
*H01J 63/04* (2006.01)

(52) U.S. Cl.
CPC ............... *H01J 63/06* (2013.01); *G01J 1/429* (2013.01); *H01J 63/04* (2013.01)

(58) Field of Classification Search
CPC . H01J 63/06; H01J 63/04; G01J 1/429; C09K 11/7777
(Continued)

(56) References Cited

U.S. PATENT DOCUMENTS

2008/0231166 A1   9/2008   Su
2010/0225224 A1   9/2010   Kuo et al.
(Continued)

FOREIGN PATENT DOCUMENTS

JP   2008-536282 A   9/2008
JP   2013-245292 A   12/2013
(Continued)

OTHER PUBLICATIONS

International Preliminary Report on Patentability dated Jul. 1, 2021 for PCT/JP2019/049006.

*Primary Examiner* — Kiet T Nguyen
(74) *Attorney, Agent, or Firm* — Faegre Drinker Biddle & Reath LLP

(57) ABSTRACT

An ultraviolet light generation target includes a light emitting layer. The light emitting layer contains a $YPO_4$ crystal to which at least scandium (Sc) is added, and receives an electron beam to generate ultraviolet light. Further, a method of manufacturing the ultraviolet light generation target includes a first step of preparing a mixture containing yttrium (Y) oxide, Sc oxide, phosphoric acid, and a liquid, a second step of evaporating the liquid, and a third step of firing the mixture.

9 Claims, 18 Drawing Sheets

(58) Field of Classification Search
USPC .................................................. 250/504 R
See application file for complete search history.

(56) References Cited

U.S. PATENT DOCUMENTS

| | | | |
|---|---|---|---|
| 2015/0287587 A1* | 10/2015 | Honda | ................... B05D 5/061 |
| | | | 427/157 |
| 2015/0294853 A1* | 10/2015 | Honda | ............... C09K 11/7774 |
| | | | 250/493.1 |
| 2018/0182609 A1* | 6/2018 | Ikeda | ................. C09K 11/7706 |

FOREIGN PATENT DOCUMENTS

| | | |
|---|---|---|
| JP | 2017-165877 A | 9/2017 |
| JP | 2018-104645 A | 7/2018 |
| WO | WO-2006/109238 A2 | 10/2006 |
| WO | WO-2018/235723 A1 | 12/2018 |

\* cited by examiner

Fig.9

| Sc CONCENTRATION (mol %) | 1600°C FIRING | 1400°C FIRING |
|---|---|---|
| 0 | 540 | 811 |
| 2 | 29007 | ... |
| 5 | 40829 | 21282 |
| 8 | 35245 | ... |
| 10 | 35118 | ... |
| 12 | ... | ... |
| 15 | 31809 | ... |
| 20 | 33590 | ... |
| 40 | 27200 | 26898 |
| 60 | 23933 | 18551 |
| 80 | ... | 11651 |
| 100 | ... | 2521 |

Fig.16

| FIRING TEMPERATURE(°C) | HALF WIDTH(°) |
|---|---|
| 600 | 0.600 |
| 800 | 0.551 |
| 1000 | 0.292 |
| 1100 | 0.208 |
| 1200 | 0.180 |
| 1400 | 0.161 |
| 1600 | 0.152 |
| 1700 | 0.159 |

ULTRAVIOLET LIGHT GENERATION TARGET, METHOD FOR MANUFACTURING ULTRAVIOLET LIGHT GENERATION TARGET, AND ELECTRON-BEAM-EXCITED ULTRAVIOLET LIGHT SOURCE

TECHNICAL FIELD

The present disclosure relates to an ultraviolet light generation target, a method of manufacturing an ultraviolet light generation target, and an electron beam excited ultraviolet light source.

BACKGROUND ART

Patent Document 1 discloses a technique related to a light source that receives an electron beam and generates ultraviolet light. In this ultraviolet light source, $Al_2O_3$ to which Sc is added (also referred to as "Sc:$Al_2O_3$") is used as a light emitting material.

CITATION LIST

Patent Literature

Patent Document 1: Japanese Patent Application Laid-Open Publication No. 2013-245292

SUMMARY OF INVENTION

Technical Problem

Conventionally, electron tubes such as a mercury xenon lamp and a deuterium lamp have been used as the ultraviolet light source. However, such an ultraviolet light source has low emission efficiency and a large size, and has problems in terms of stability and life-span. Further, when the mercury xenon lamp is used, there is a concern that mercury affects an environment.

Further, as another ultraviolet light source, there is a light source that excites ultraviolet light by irradiating a target with an electron beam (see, for example, Patent Document 1). Such a light source is expected in the field of optical measurement utilizing high stability, for sterilization and disinfection utilizing low power consumption, or as a medical light source or a biochemical light source utilizing high wavelength selectivity. Further, in addition to the above Sc:$Al_2O_3$, a useful light emitting material for electron beam excitation is required for the light source that excites ultraviolet light with an electron beam.

An object of the present invention is to provide an ultraviolet light generation target containing a useful light emitting material for electron beam excitation different from Sc:$Al_2O_3$, a manufacturing method thereof, and an electron beam excited ultraviolet light source.

Solution to Problem

An embodiment of the present invention is an ultraviolet light generation target. The ultraviolet light generation target includes a light emitting portion containing a $YPO_4$ crystal to which at least scandium (Sc) is added, and for receiving an electron beam to generate ultraviolet light.

An embodiment of the present invention is an ultraviolet light generation target manufacturing method. The ultraviolet light generation target manufacturing method is a method of manufacturing the ultraviolet light generation target having the above configuration, and includes a first step of preparing a mixture containing yttrium (Y) oxide, scandium (Sc) oxide, phosphoric acid or a phosphoric acid compound, and a liquid, a second step of evaporating the liquid, and a third step of firing the mixture.

An embodiment of the present invention is an electron beam excited ultraviolet light source. The electron beam excited ultraviolet light source includes the ultraviolet light generation target having the above configuration, and an electron source for irradiating the light emitting portion with the electron beam.

Advantageous Effects of Invention

According to the embodiments of the present invention, it is possible to provide an ultraviolet light generation target containing a useful light emitting material for electron beam excitation different from Sc:$Al_2O_3$, a manufacturing method thereof, and an electron beam excited ultraviolet light source.

BRIEF DESCRIPTION OF DRAWINGS

FIG. 9 is a table showing numerical values on which FIG. 8 is based.

FIG. 16 is a table showing numerical values on which FIG. 15 is based.

DESCRIPTION OF EMBODIMENTS

Figure 1:
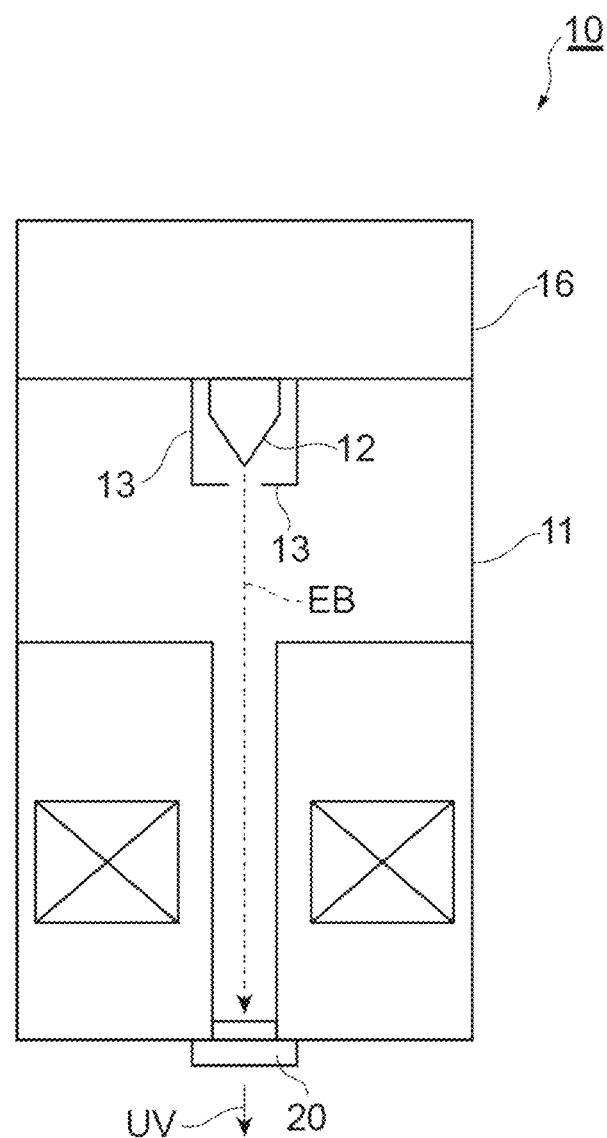
FIG. 1 is a schematic view illustrating an internal configuration of an electron beam excited ultraviolet light source including an ultraviolet light generation target according to an embodiment.

Hereinafter, embodiments of an ultraviolet light generation target, a method of manufacturing an ultraviolet light generation target, and an electron beam excited ultraviolet light source will be described in detail with reference to the accompanying drawings. In the description of the drawings, the same elements will be denoted by the same reference signs, without redundant description FIG. 1 is a schematic diagram illustrating an internal configuration of an electron beam excited ultraviolet light source 10 including an ultraviolet light generation target according to an embodiment. As illustrated in FIG. 1, in the electron beam excited ultraviolet light source 10, an electron source 12 and an extraction electrode 13 are arranged on an upper end side inside an evacuated container (electron tube) 11. Further, when an appropriate extraction voltage is applied from a power supply unit 16 between the electron source 12 and the extraction electrode 13, an electron beam EB accelerated by a high voltage is emitted from the electron source 12. For example, an electron source that emits an electron beam having a large area (for example, a cold cathode such as carbon nanotube or a hot cathode) is used as the electron source 12.

Further, an ultraviolet light generation target 20 is disposed on a lower end side inside the container 11. The ultraviolet light generation target 20 is set to, for example, a ground potential, and a negative high voltage is applied to the electron source 12 from the power supply unit 16. Accordingly, the ultraviolet light generation target 20 is irradiated with the electron beam EB emitted from the electron source 12. The ultraviolet light generation target 20 is excited by receiving the electron beam EB, and generates ultraviolet light UV.

Figure 2:
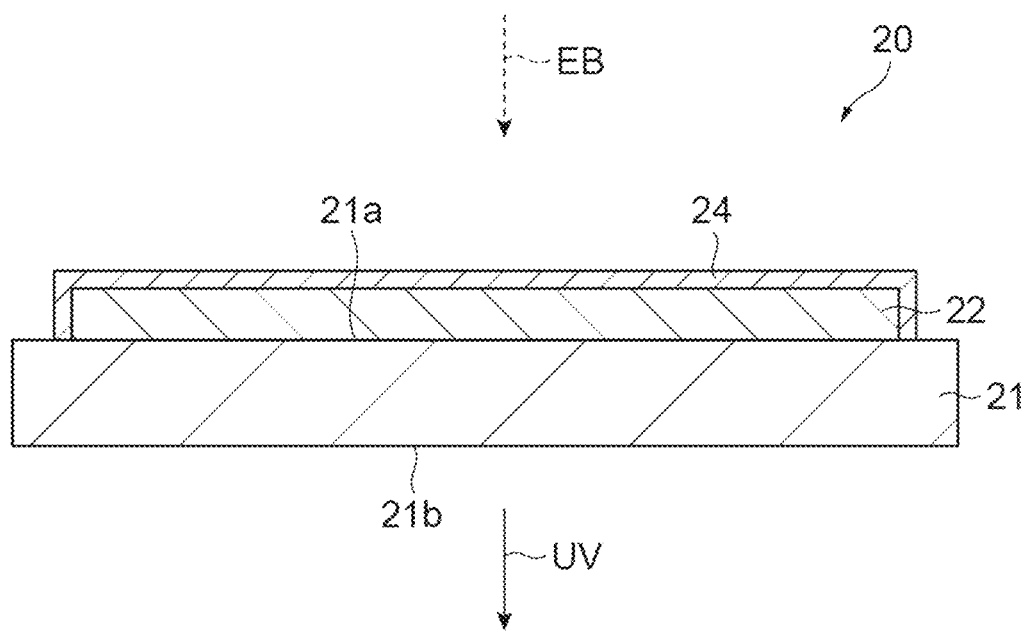
FIG. 2 is a cross-sectional view illustrating a configuration of the ultraviolet light generation target.

FIG. 2 is a cross-sectional view illustrating a configuration of the ultraviolet light generation target 20. As illustrated in FIG. 2, the ultraviolet light generation target 20 includes a substrate 21, a light emitting layer 22 provided on the substrate 21, and a light reflection film 24 provided on the light emitting layer 22. The substrate 21 is a plate-shaped member made of a material that transmits the ultraviolet light UV, and is made of sapphire ($Al_2O_3$) in the present embodiment. The substrate 21 has a principal surface 21a and a rear surface 21b. A thickness of the substrate 21 is, for example, 0.1 mm or more and 10 mm or less.

The light emitting layer 22 is an example of a light emitting portion in the present embodiment. The light emitting layer 22 is in contact with the principal surface 21a of the substrate 21, is excited by receiving the electron beam EB, and generates the ultraviolet light UV. Further, the light emitting layer 22 contains an oxide crystal containing a rare earth element to which an activator is added.

In the present embodiment, the activator is scandium (Sc). In addition to Sc, bismuth (Bi) may be added as the activator. Further, the oxide crystal containing the rare earth element is oxide of yttrium (Y) and phosphorus (P), that is, $YPO_4$ (yttrium phosphate). In one example, a composition of the light emitting layer 22 can be represented as $Sc_xBi_yY_{1-x-y}PO_4$ ($0<x<1$, $0 \leq y<1$). In addition, the light emitting layer 22 may contain an activator other than Sc and Bi, or a rare earth element other than Y, and may not contain any of these elements. A film thickness of the light emitting layer 22 is, for example, 0.1 µm or more and 1 mm or less.

As illustrated in examples to be described later, a molar composition ratio of Sc contained in components excluding P and O, that is, a composition x of Sc may be 0.02 or more, and may be 0.6 or less. In other words, a concentration of Sc contained in components excluding P and O (hereinafter, may be simply referred to as an Sc concentration) may be 2 mol % or more, and may be 60 mol % or less. In this case, an emission intensity of the ultraviolet light UV (in other words, a conversion efficiency of an energy of the electron beam into the ultraviolet light) can be significantly increased.

Further, the composition x of Sc may be 0.03 or more, 0.04 or more, or 0.05 or more. In other words, the Sc concentration may be 3 mol % or more, 4 mol % or more, or 5 mol % or more. At such a concentration level, as the concentration becomes higher, the emission intensity of the ultraviolet light UV can be further increased.

Further, the composition x of Sc may be 0.5 or less, 0.4 or less, or 0.3 or less. In other words, the Sc concentration may be 50 mol % or less, 40 mol % or less, or 30 mol % or less. At such a concentration level, as the concentration becomes lower, the emission intensity of the ultraviolet light UV can be further increased.

A degree of crystallization of the light emitting layer 22 changes depending on a sintering temperature. As illustrated in the examples to be described later, a half width of a diffraction intensity peak waveform of a <200> plane of the light emitting layer 22 measured by an X-ray diffractometer (X-ray diffraction: XRD) using CuKα rays (wavelength 1.54 Å) may be 0.25° or less. In this case, the emission intensity of the ultraviolet light UV can also be significantly increased. Further, the half width may be 0.20° or less, 0.18° or less, or 0.16° or less. In this case, the emission intensity of the ultraviolet light UV can be further increased.

The light reflection film 24 contains a metallic material such as aluminum. The light reflection film 24 completely covers an upper surface and a side surface of the light emitting layer 22. Of the ultraviolet light UV generated in the light emitting layer 22, light traveling in a direction opposite to the substrate 21 is reflected by the light reflection film 24 and travels toward the substrate 21.

In the ultraviolet light generation target 20, when the electron beam EB emitted from the electron source 12 (see FIG. 1) is incident on the light emitting layer 22, the light emitting layer 22 is excited, and the ultraviolet light UV is generated. A part of the ultraviolet light UV is directly directed to the principal surface 21a of the substrate 21, and the rest of the ultraviolet light UV is directed to the principal surface 21a of the substrate 21 after being reflected by the light reflection film 24. Thereafter, the ultraviolet light UV is incident on the principal surface 21a, passes through the substrate 21, and then is emitted to the outside from the rear surface 21b.

Figure 3:
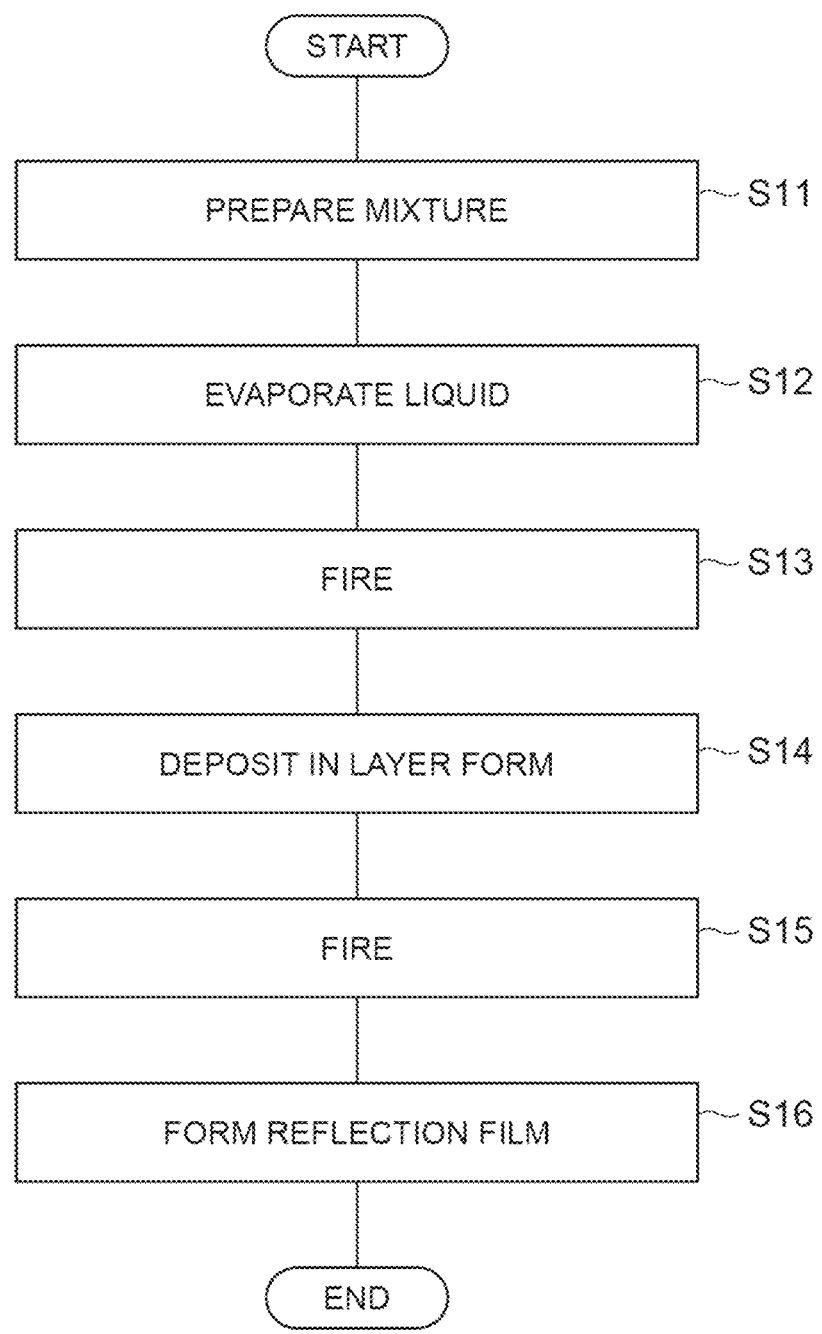
FIG. 3 is a flowchart illustrating steps in a method of manufacturing the ultraviolet light generation target.

FIG. 3 is a flowchart illustrating steps in a method of manufacturing the ultraviolet light generation target 20. First, in a first step S11, a mixture that contains Y oxide ($Y_2O_3$), Sc oxide ($Sc_2O_3$), phosphoric acid ($H_3PO_4$) or a phosphoric acid compound (for example, ammonium dihydrogen phosphate ($NH_4H_2PO_4$), and a liquid (for example, pure water) is prepared. At this time, Bi oxide ($Bi_2O_3$) may be further added to the mixture. Specifically, the Y oxide, the Sc oxide, and the phosphoric acid (, and the Bi oxide) are put into the liquid contained in the container, and sufficiently stirred. A time required for stirring is, for example, 24 hours. Accordingly, the phosphoric acid and the oxides are reacted with each other in the container and aged.

In the first step S11, a mixing ratio of the Sc oxide may be 1.2 mass % or more and 47.8 mass % or less. Accordingly, the light emitting layer 22 in which the concentration of Sc contained in the components excluding P and O is 2 mol % or more and 60 mol % or less (that is, the composition x of Sc is 0.02 or more and 0.6 or less) can be preferably prepared. Further, the mixing ratio of the Sc oxide may be 1.9 mass % or more, 2.5 mass % or more, or 3.1 mass % or more. Further, the mixing ratio of the Sc oxide may be 37.9 mass % or less, 28.9 mass % or less, or 20.7 mass % or less.

Next, in a second step S12, the liquid is evaporated by heating the mixture. Accordingly, a powdery mixture obtained by removing the liquid from the mixture is prepared. In one example, a heating temperature is in a range of 100 to 300° C., and a heating time is in a range of 1 to 5 hours.

Subsequently, in a third step S13, the mixture is fired (heat-treated). Specifically, first, the mixture input in a crucible is placed in a heat treatment furnace (for example, an electric furnace). Further, the mixture is heat-treated in the air, and is fired. A firing temperature at this time is, for example, 1050° C. or higher, and 1700° C. or lower. A firing time is, for example, in a range of 2 hours. Accordingly, constituent materials of the mixture are crystallized.

In addition, the firing temperature may be, for example, 1100° C. or higher, 1200° C. or higher, 1300° C. or higher, 1400° C. or higher, or 1500° C. or higher. In one example, the firing temperature is 1600° C. In the temperature range of 1600° C. or lower, as the firing temperature becomes higher, the degree of crystallization of the light emitting layer 22 becomes higher, and thus, the emission intensity of the ultraviolet light UV can be further increased.

Subsequently, in a fourth step S14, the fired mixture is disposed in a layer form on the substrate 21. At this time, the powdery mixture may be placed on the substrate 21 as it is, or a sedimentation method may be used. The sedimentation method is a method of putting the powdery mixture into a liquid such as alcohol, dispersing the mixture in the liquid by using ultrasonic waves or the like, naturally precipitating the mixture on the substrate 21 disposed at the bottom of the liquid, and drying the mixture. Such a method is used, and thus, the mixture can be deposited on the substrate 21 with a uniform density and thickness. As stated above, the light emitting layer 22 is formed on the substrate 21.

Subsequently, in a fifth step S15, the light emitting layer 22 may be fired (heat-treated) again. This firing is performed in the air in order to sufficiently evaporate alcohol and to increase adhesion between the substrate 21 and the mixture and between the mixtures. The firing temperature at this time is, for example, 1100° C., and the firing time is, for example, 2 hours.

Finally, in a sixth step S16, the light reflection film 24 is formed so as to cover the upper surface and the side surface of the light emitting layer 22. A method for forming the light reflection film 24 is, for example, vacuum deposition. A thickness of the light reflection film 24 on the upper surface of the light emitting layer 22 is, for example, 50 nm. Through the above steps, the ultraviolet light generation target 20 of the present embodiment is completed.

In addition, in the above description, the mixture is deposited on the substrate 21 after the mixture is fired, but the mixture may be fired after the mixture before firing is deposited on the substrate 21. In that case, the mixture may be deposited on the substrate 21 by the sedimentation method described above.

Figure 4:
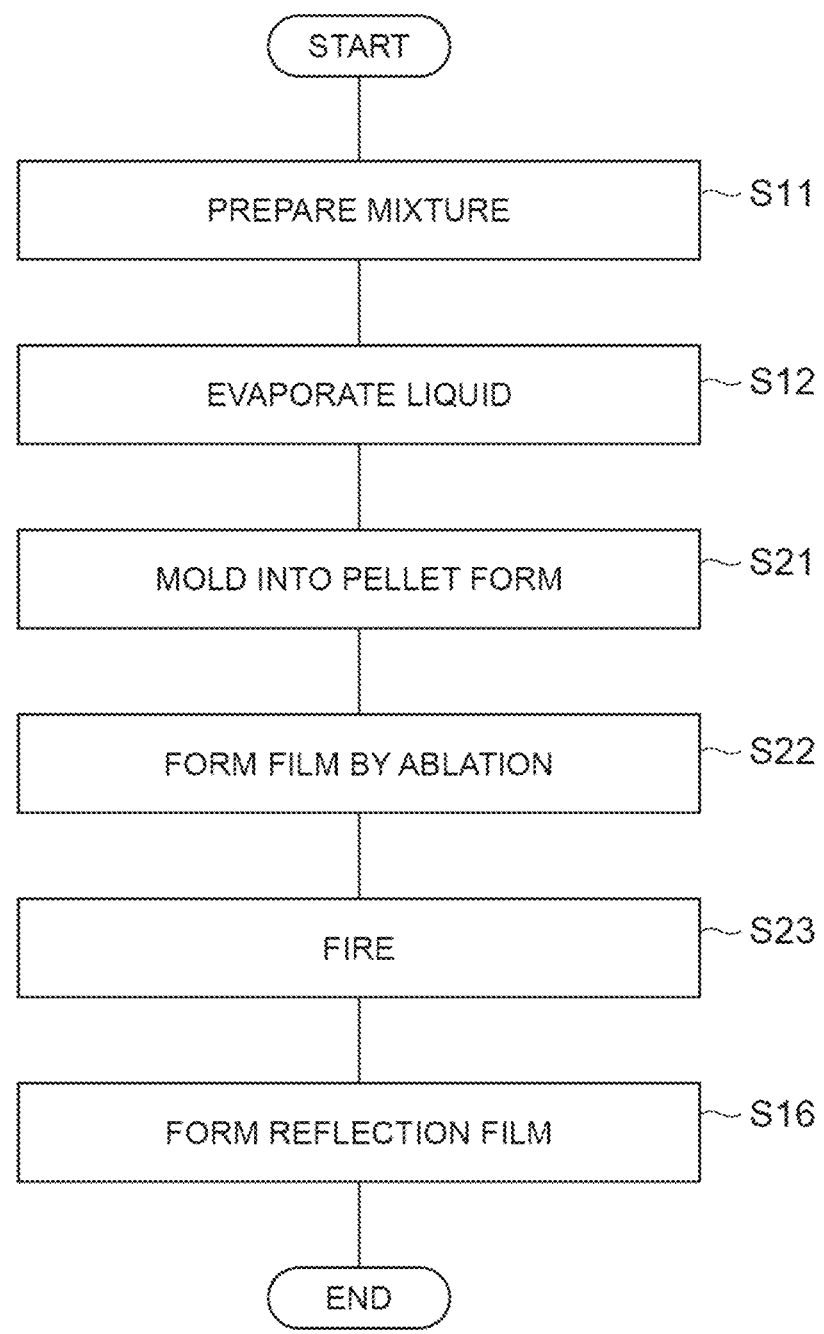
FIG. 4 is a flowchart illustrating steps in a method of manufacturing the ultraviolet light generation target by laser ablation.

Further, the mixture may be deposited on the substrate 21 by laser ablation. FIG. 4 is a flowchart illustrating steps in a method of manufacturing the ultraviolet light generation target 20 by the laser ablation. In addition, since the first step S11 and the second step S12 are the same as above, detailed description thereof will be omitted.

In a third step S21 after the second step S12, a target is prepared by molding the powdery mixture into a pellet form. Next, in a fourth step S22, the substrate 21 (for example, a sapphire substrate) is prepared, the substrate 21 is placed on a rotating holder of a laser ablation apparatus, and the prepared target is placed on a sample mounting stage. Further, the inside of the vacuum container is evacuated, and the substrate 21 is heated to a predetermined temperature (for example, 800° C.) by a heater.

Thereafter, a laser beam (for example, a laser beam from a KrF excimer laser (wavelength 248 nm)) is introduced from a laser introduction port and the target is irradiated while supplying an oxygen gas from a gas introduction port to the inside of the vacuum container. Raw materials constituting the target receive the laser beam, evaporate, and scatter inside the vacuum container. A part of the scattered raw materials adheres to one exposed surface of the substrate 21, and an amorphous layer of $Sc:YPO_4$ is formed (ablation film forming). As a result, $Sc:YPO_4$ is disposed in a layer form on the substrate 21.

A time in which the $Sc:YPO_4$ layer is formed is appropriately adjusted such that the amorphous layer has a desired thickness. The thickness of the amorphous layer may be 2 μm or less. Further, from the viewpoint that a preferable amorphous layer is obtained and the emission intensity of the ultraviolet light is excellent, the thickness of the amorphous layer may be preferably 1.8 μm or less, more preferably 1.6 μm or less, still more preferably 1.4 μm or less, and particularly preferably 1.2 μm or less.

Further, the thickness of the amorphous layer may be 0.05 μm or more. From the viewpoint that the emission intensity of the ultraviolet light is excellent, the thickness of the amorphous layer may be preferably 0.1 μm or more, more preferably 0.5 μm or more, still more preferably 0.8 μm or more, and particularly preferably 1.0 μm or more.

Subsequently, in a fifth step S23, the amorphous layer of $Sc:YPO_4$ formed on the one surface of the substrate 21 is fired. Specifically, the substrate 21 on which the amorphous layer is formed is taken out from the laser ablation apparatus and put into a firing apparatus. Further, a temperature inside the firing apparatus is set to a temperature higher than, for example, 1600° C., and the amorphous layer on the substrate 21 is fired by maintaining the temperature for a predetermined time. Accordingly, the light emitting layer 22 is formed on the one surface of the substrate 21.

A firing atmosphere may be, for example, vacuum or the air. The firing temperature may be, for example, 1800° C. or lower, and further, preferably 1700° C. or lower, more preferably 1600° C. or lower, still more preferably 1500° C. or lower, and particularly preferably 1400° C. or lower, from the viewpoint that film forming properties of the light emitting layer 22 and the emission intensity of the ultraviolet light are excellent. Further, the firing temperature may be, for example, 1000° C. or higher. The firing time may be, for example, 1 to 10 hours.

Effects obtained by the ultraviolet light generation target 20, the manufacturing method thereof, and the electron beam excited ultraviolet light source 10 of the present embodiment described above will be described.

As described above, the light emitting layer 22 of the ultraviolet light generation target 20 contains the $YPO_4$ crystal to which at least Sc is added. According to experiments of the present inventors to be described later, when the light emitting layer 22 having such a composition is irradiated with the electron beam EB, the ultraviolet light UV having a wavelength of around 240 nm (241 nm in the experiment) can be excited. Thus, according to the present embodiment, it is possible to provide the ultraviolet light generation target 20 containing a useful light emitting material for electron beam excitation different from $Sc:Al_2O_3$.

Further, the method of manufacturing the ultraviolet light generation target 20 according to the present embodiment includes the first step of S11 of preparing the mixture containing the Y oxide, the Sc oxide, the phosphoric acid, and the liquid, the second step S12 of evaporating the liquid by heating the mixture, and the third step S13 (or the fifth step S23) of firing the mixture, as illustrated in FIG. 3 and FIG. 4. According to such a manufacturing method, the light emitting layer 22 can be preferably prepared. In addition, as illustrated in the examples to be described later, the emission intensity of the ultraviolet light UV can be further increased by such a liquid phase method (also referred to as a solution method), compared to a method (solid phase method) of simply mixing and firing powders of the Y oxide, the Sc oxide, and the phosphoric acid.

As described above, Bi may be further added to the $YPO_4$ crystal of the light emitting layer 22. Further, for the above, the mixture further containing the Bi oxide may be prepared in the first step S11. In this case, the ultraviolet light UV can also be effectively excited by irradiating the light emitting layer 22 with the electron beam EB.

As described above, the concentration of Sc contained in the $YPO_4$ crystal may be 2 mol % or more and 60 mol % or less. Further, for the above, in the first step S11, the mixing ratio of the Sc oxide may be 1.2 mass % or more and 47.8 mass % or less. According to the experiments of the present inventors to be described later, when the concentration of Sc is within such a range, the emission intensity of the ultraviolet light UV can be remarkably increased.

As described above, the half width of the diffraction intensity peak waveform of the <200> plane measured by the X-ray diffractometer using CuKα rays may be 0.25° or less. Further, for the above, the firing temperature may be set to 1050° C. or higher in the third step S13. According to the experiments of the present inventors to be described later, the emission intensity of the ultraviolet light UV can be remarkably increased in such a case.

Further, the electron beam excited ultraviolet light source 10 according to the present embodiment includes the ultraviolet light generation target 20, and the electron source 12 that irradiates the light emitting layer 22 with the electron beam EB. According to the electron beam excited ultraviolet light source 10, it is possible to provide an ultraviolet light source containing the useful light emitting material for electron beam excitation different from $Sc:Al_2O_3$ by providing the ultraviolet light generation target 20.

FIRST EXAMPLE

Here, a first example of the above-described embodiment will be described. The present inventors actually prepared a plurality of samples ($Sc:YPO_4$) as the light emitting layer 22 by a method to be described below. First, a plurality of mixtures were prepared by mixing $Y_2O_3$, $Sc_2O_3$, and $H_3PO_4$ with pure water. At this time, the ratios of $Sc_2O_3$ in the mixtures were different from each other such that the concentrations of Sc contained in components excluding P and O in the samples are 0 mol %, 2 mol %, 5 mol %, 8 mol %, 10 mol %, 12 mol %, 15 mol %, 20 mol %, 40 mol %, 60 mol %, 80 mol %, and 100 mol %.

Next, each mixture was sufficiently stirred over 24 hours, $Y_2O_3$, $Sc_2O_3$, and $H_3PO_4$ were reacted with each other, and aged. Thereafter, the pure water was evaporated by heating the mixture, and the powdery mixture was obtained. Subsequently, the mixture was fired in the air. At this time, the sample in which the Sc concentration is 5 mol % was further divided into a plurality of samples, one sample thereof was not fired, and firing temperatures of 800° C., 1000° C., 1100° C., 1200° C., 1400° C., 1500° C., 1600° C., and 1700° C. were set for the other samples.

Further, a firing temperature of 1600° C. was set for the samples with 2 mol %, 8 mol %, 10 mol %, 12 mol %, 15 mol %, and 20 mol % among the samples with other Sc concentrations. Two firing temperatures of 1400° C. and 1600° C. were set for the samples with 0 mol %, 40 mol %, and 60 mol %, and a firing temperature of 1400° C. was set for the samples with 80 mol % and 100 mol %. The firing time was 2 hours. Thereafter, the sample was deposited in a layer form on a disk-shaped quartz substrate by the above-described sedimentation method.

Figure 5:
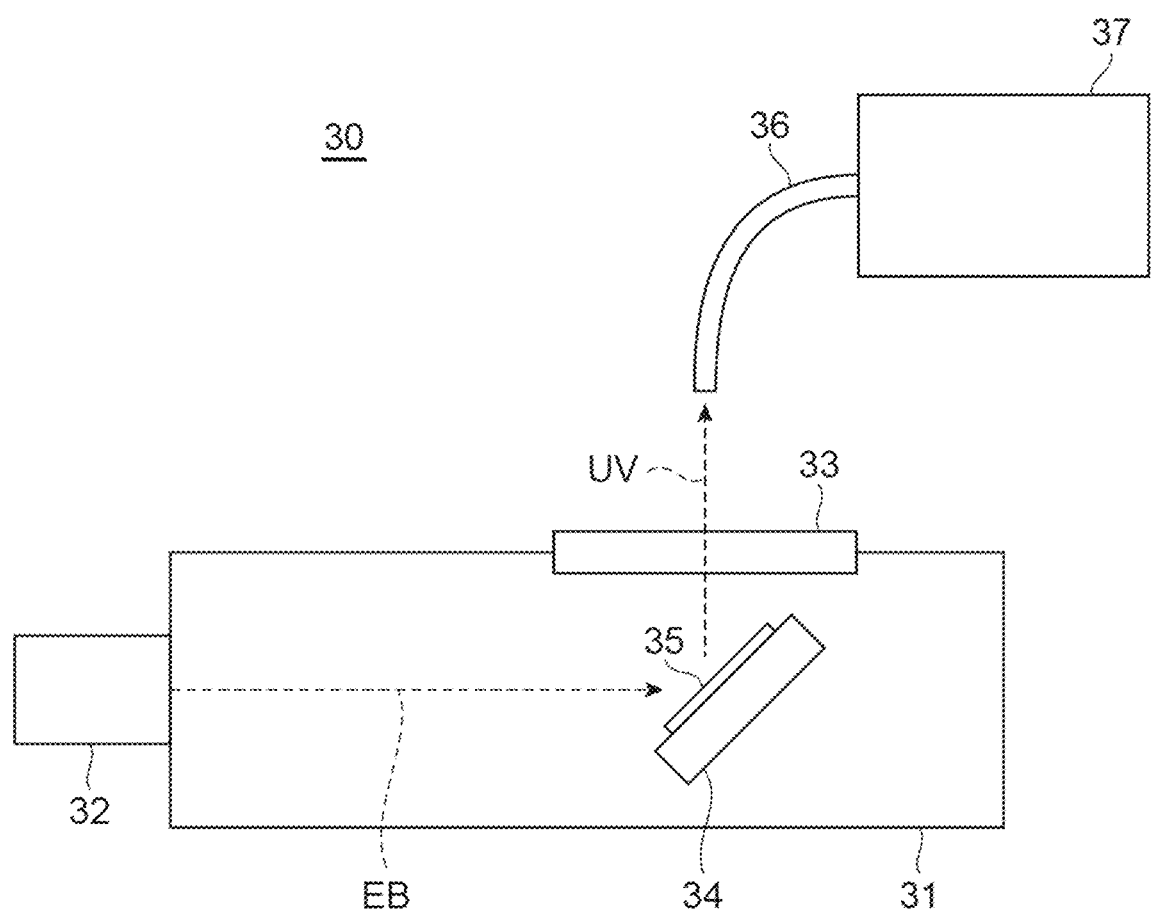
FIG. 5 is a diagram schematically illustrating an experimental apparatus used in an example.

FIG. 5 is a diagram schematically illustrating an experimental apparatus used in the present example. This apparatus 30 includes a metal cylindrical vacuum container 31, an electron source 32 (manufactured by Hamamatsu Photonics) disposed at one end of the vacuum container 31, and an observation window 33 provided on a side wall near the other end of the vacuum container 31.

An irradiation axis of the electron beam EB of the electron source 32 was aligned with a central axis of the vacuum container 31, and a sample 35 on a quartz substrate 34 disposed on the other end side of the vacuum container 31 was irradiated with the electron beam EB. At this time, a front surface of the quartz substrate 34 was tilted at 45° toward the observation window 33 with respect to the central axis of the vacuum container 31, and the ultraviolet light UV generated from the sample 35 was emitted from the observation window 33. A spectroscopic detector 37 (Photonic Multi-Analyzer PMA-12 of model number C10027-01 manufactured by Hamamatsu Photonics) was disposed outside the vacuum container 31, and an optical fiber 36 connected to the spectroscopic detector 37 was provided such that a tip thereof faces the observation window 33. The energy of the electron beam EB was 10000 eV.

Figure 6:
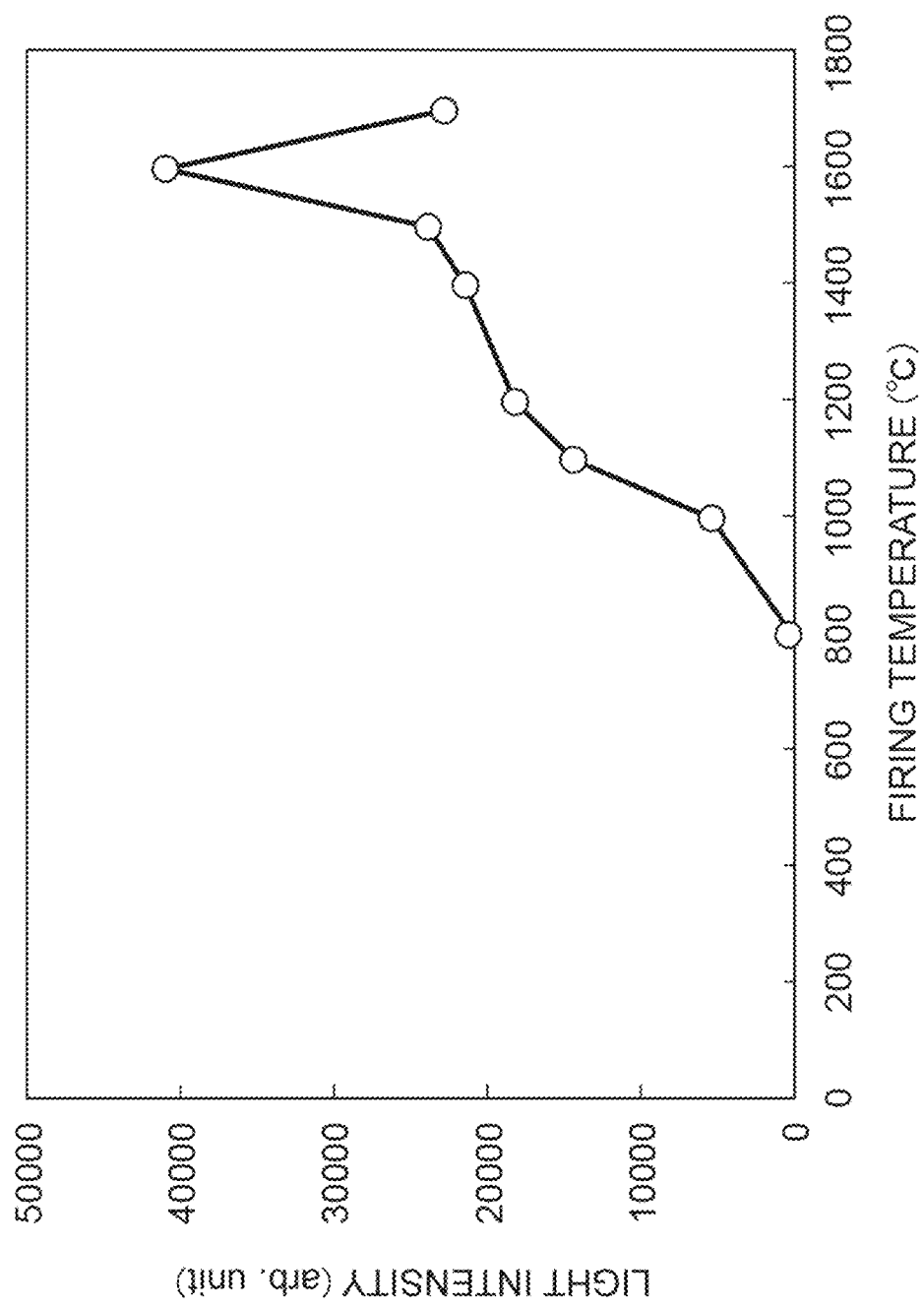
FIG. 6 is a graph showing a relationship between a firing temperature and an emission intensity obtained in a first example.
Figure 7:
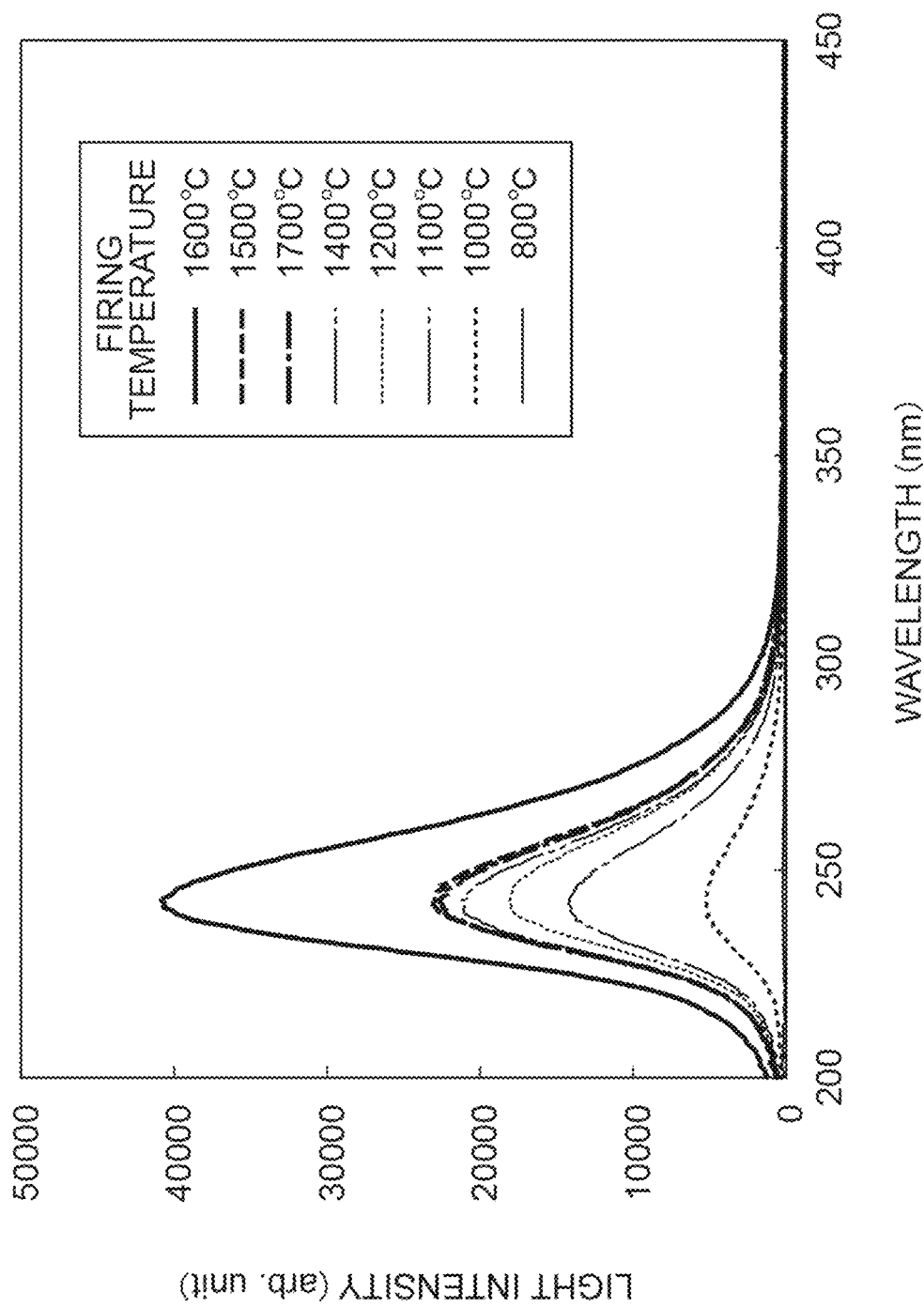
FIG. 7 is a graph showing emission spectra for firing temperatures obtained in the first example.

FIG. 6 is a graph showing a relationship between the firing temperature and the emission intensity obtained by the apparatus 30. Further, FIG. 7 is a graph showing an emission spectrum for each firing temperature obtained by the apparatus 30. As is clear from FIG. 6 and FIG. 7, the emission intensity is highest when the firing temperature is 1600° C., and the emission intensity gradually increases as the firing temperature increases up to 1600° C. In particular, the emission intensity increases remarkably from 1000° C. to 1100° C. That is, the firing temperature is set to 1050° C. or higher, and thus, the emission intensity can be remarkably increased. In addition, the emission intensity decreases when the firing temperature exceeds 1600° C., but a sufficient emission intensity is obtained even when the firing temperature is 1700° C.

Figure 8:
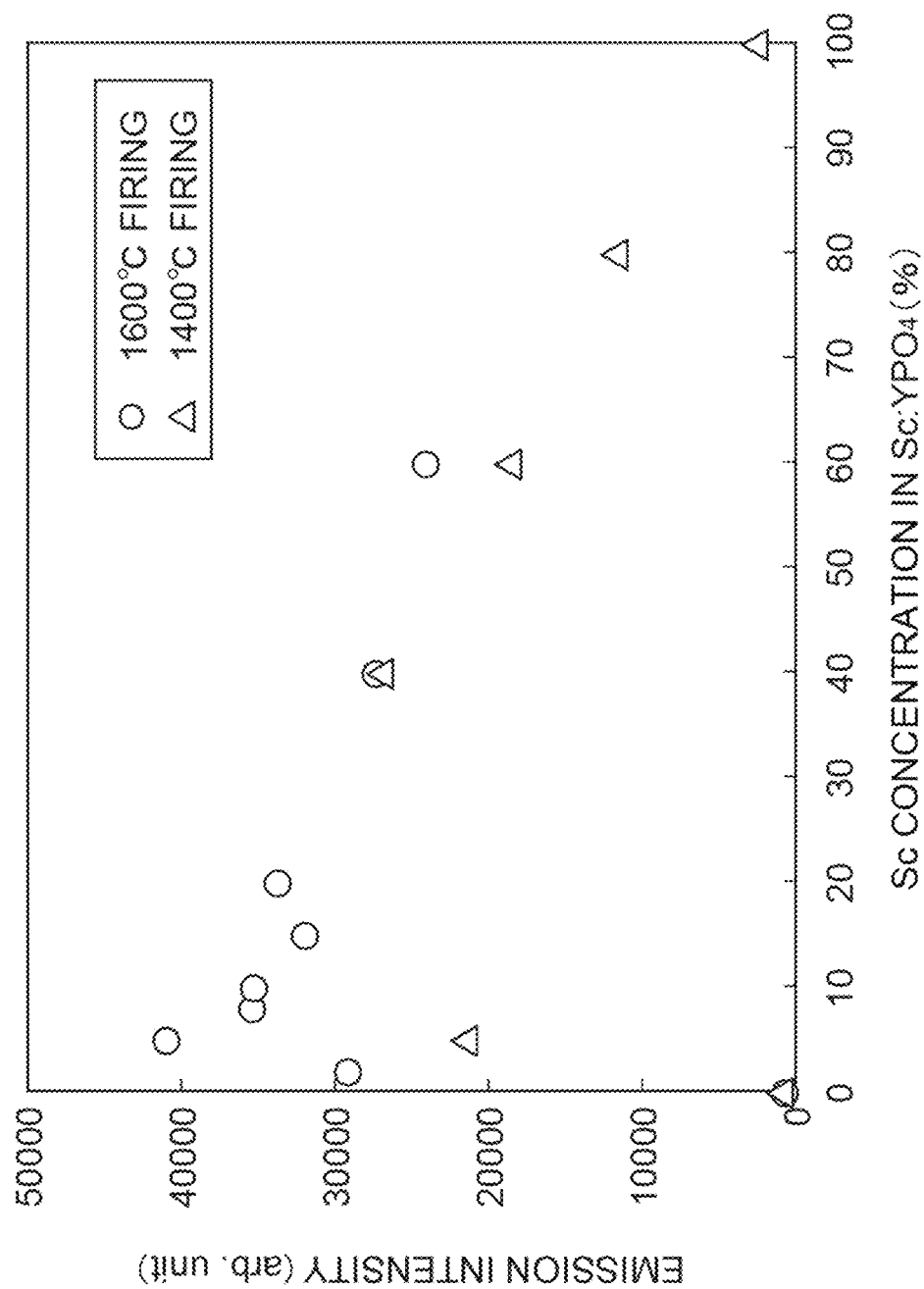
FIG. 8 is a graph showing a relationship between a concentration of Sc contained in components excluding P and O and an emission intensity obtained in the first example.
Figure 10:
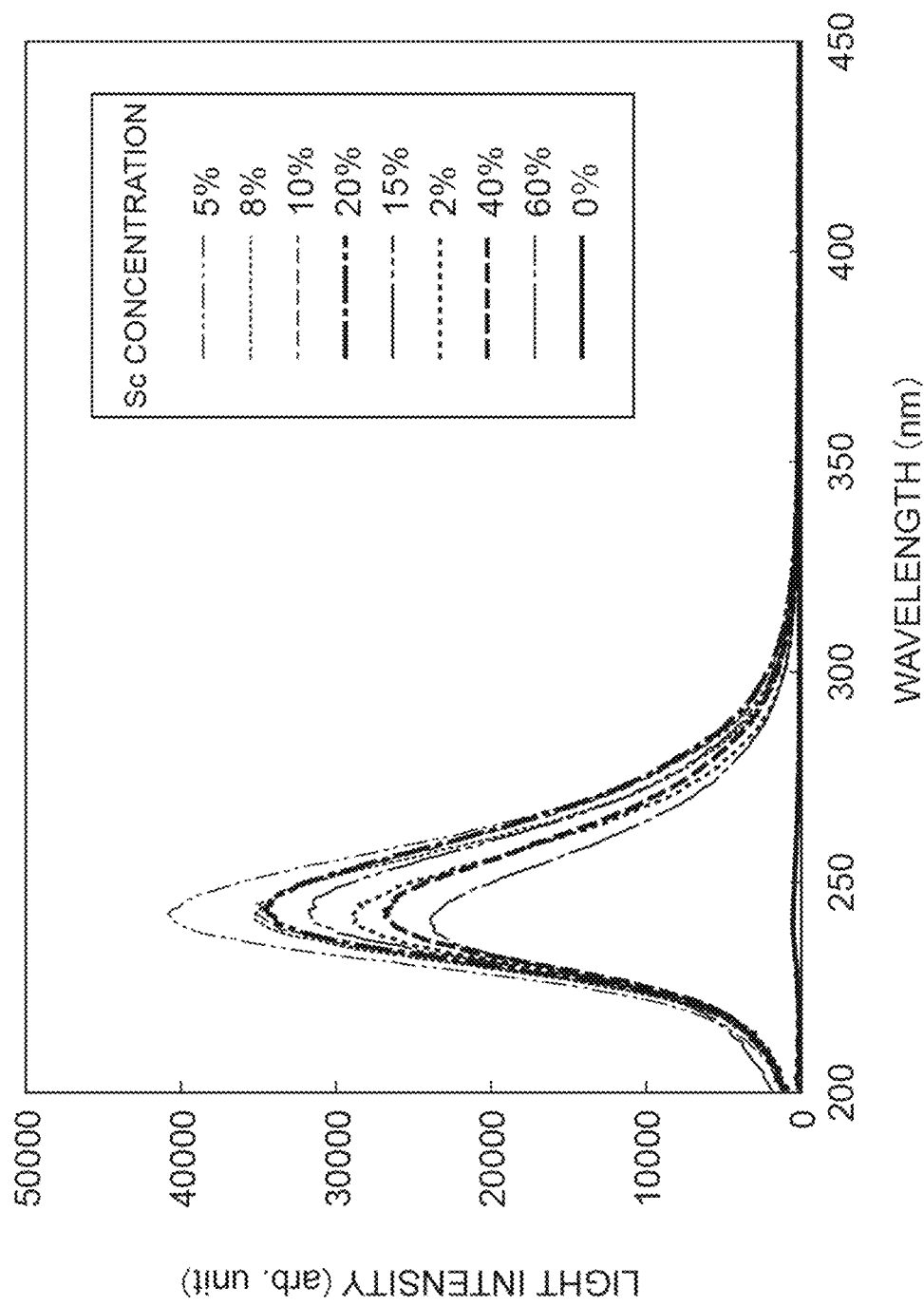
FIG. 10 is a graph showing emission spectra for Sc concentrations.
Figure 11:
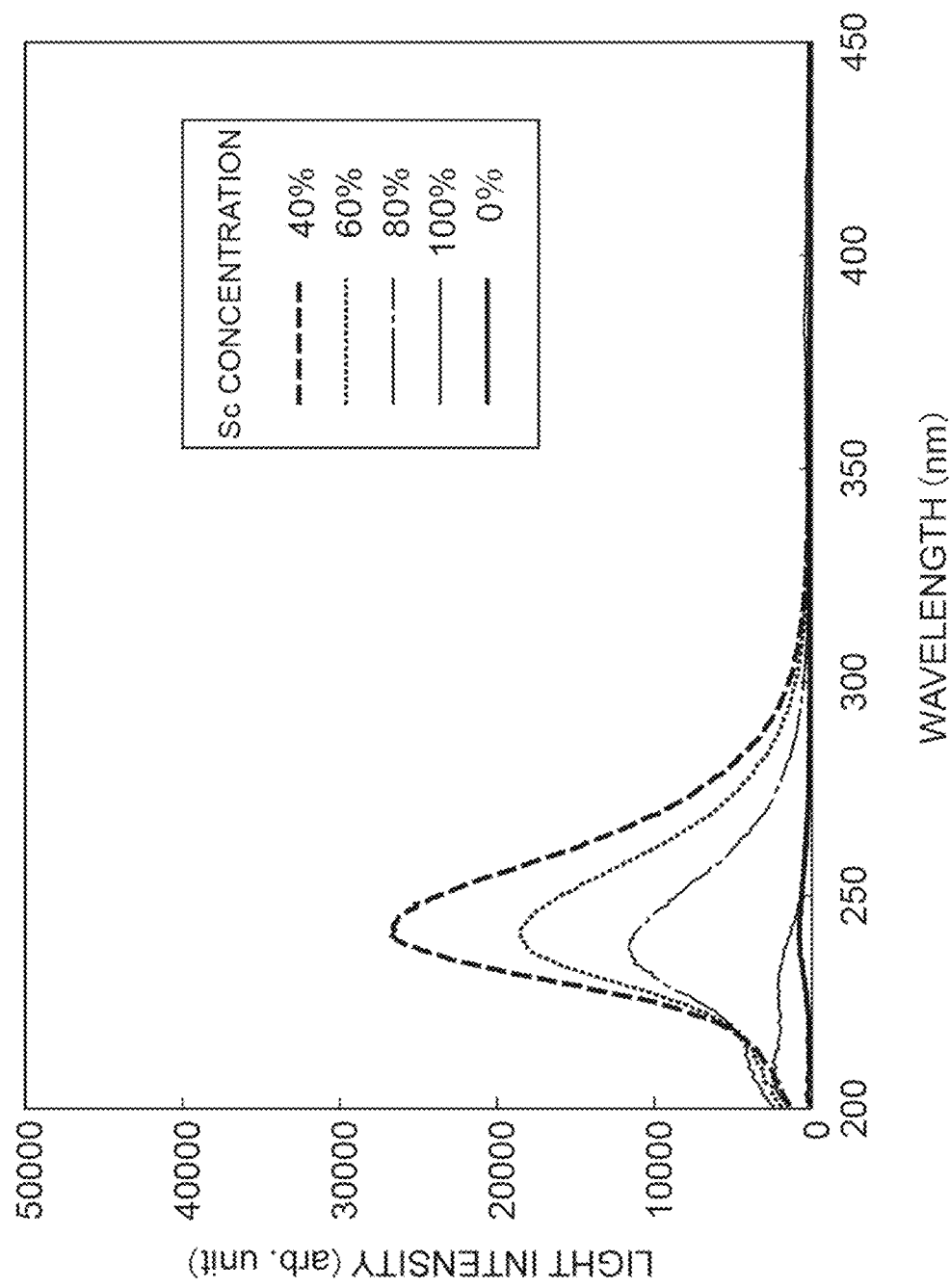
FIG. 11 is a graph showing emission spectra for Sc concentrations.

FIG. 8 is a graph showing a relationship between the concentration of Sc contained in the components excluding P and O and the emission intensity obtained by the apparatus 30. In addition, in this graph, ○ is a plot when the firing temperature is 1600° C., and Δ is a plot when the firing temperature is 1400° C. FIG. 9 is a table showing numerical values on which FIG. 8 is based. Further, FIG. 10 and FIG. 11 are graphs showing emission spectra for the Sc concentrations obtained by the apparatus 30.

As is clear from FIG. 8 to FIG. 11, the emission intensity is highest when the Sc concentration is 5 mol %, and a relatively high emission intensity is obtained in the range of 2 mol % to 60 mol %. In addition, in the range larger than 40 mol %, the emission intensity gradually decreases as the Sc concentration increases. In addition, such characteristics depend on the Sc concentration, and it is considered that such a tendency does not change even when an activator other than Sc (for example, Bi or the like) is further added.

Figure 12:
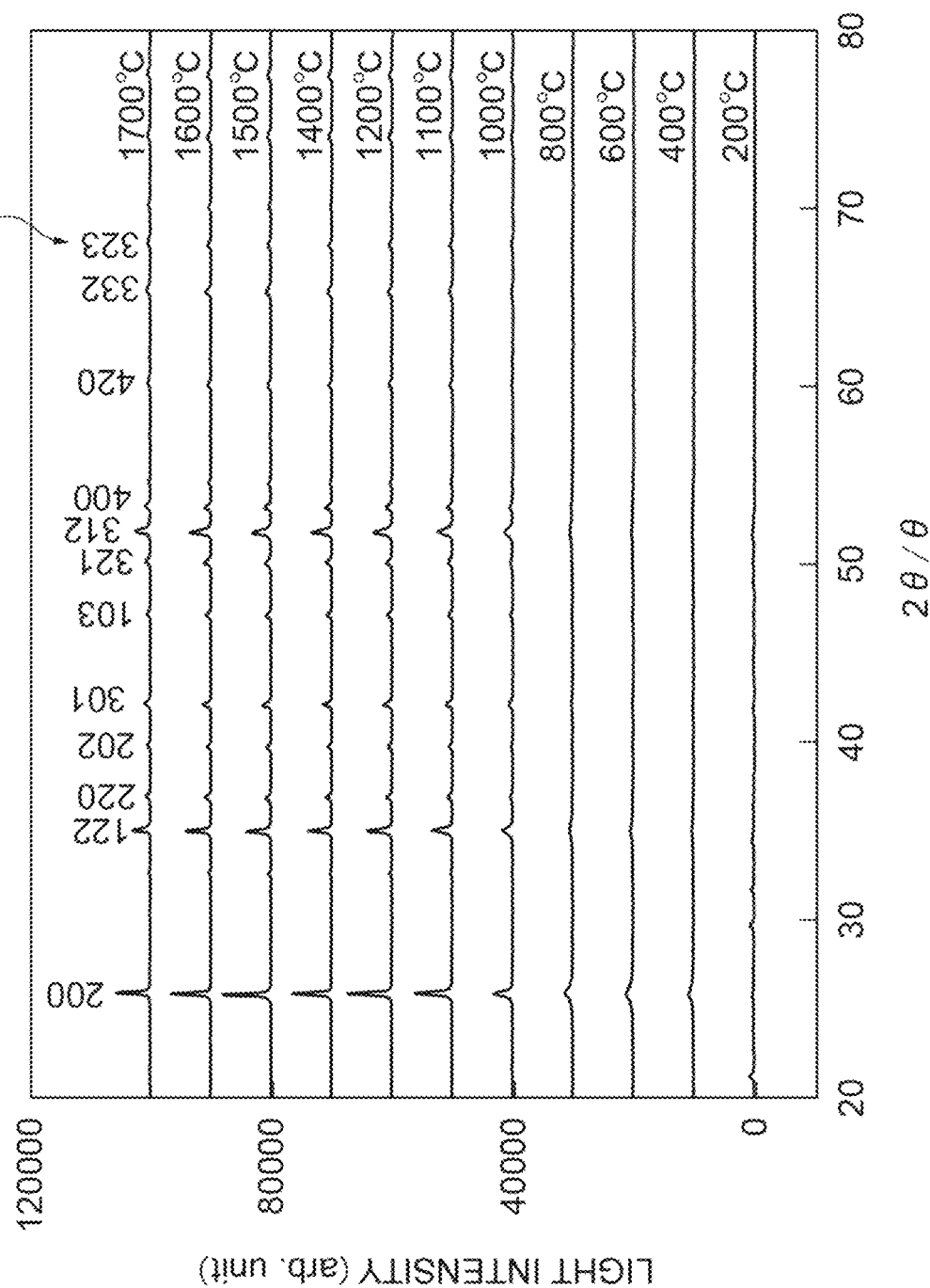
FIG. 12 is a graph showing diffraction intensity waveforms of samples with firing temperatures different from each other measured by an X-ray diffractometer using CuKα rays.

Here, the result obtained by investigating a relationship between the firing temperature and the crystallinity of the sample will be described. FIG. 12 is a graph showing diffraction intensity waveforms of samples (Sc concentration is 5 mol %) with firing temperatures different from each other measured by the X-ray diffractometer using the CuKα rays. In this graph, the firing temperatures corresponding to the diffraction intensity waveforms are also represented. Further, the plurality of numerical values A described in this graph represents crystal plane orientations corresponding to peaks in the diffraction intensity waveforms. Referring to FIG. 12, it can be seen that a slight diffraction line appears when the firing temperature exceeds 400° C. Further, as the firing temperature becomes higher, the diffraction line becomes clearer gradually and the diffraction peak intensity increases.

Figure 13:
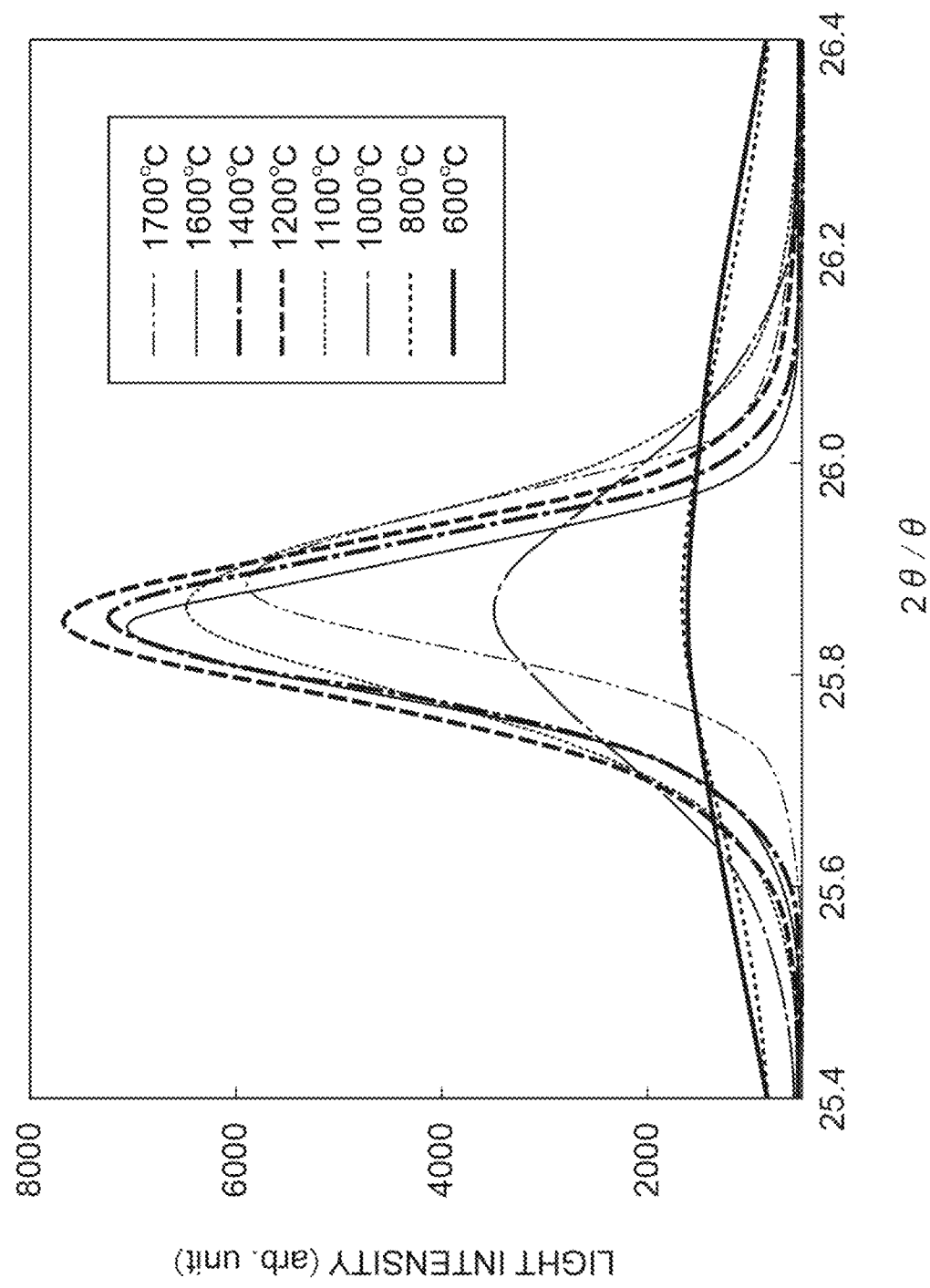
FIG. 13 is a graph showing enlarged and superimposed diffraction intensity peak waveforms near a <200> plane (near 2θ/θ=26°) in the diffraction intensity waveforms at the firing temperatures shown in FIG. 12.
Figure 14:
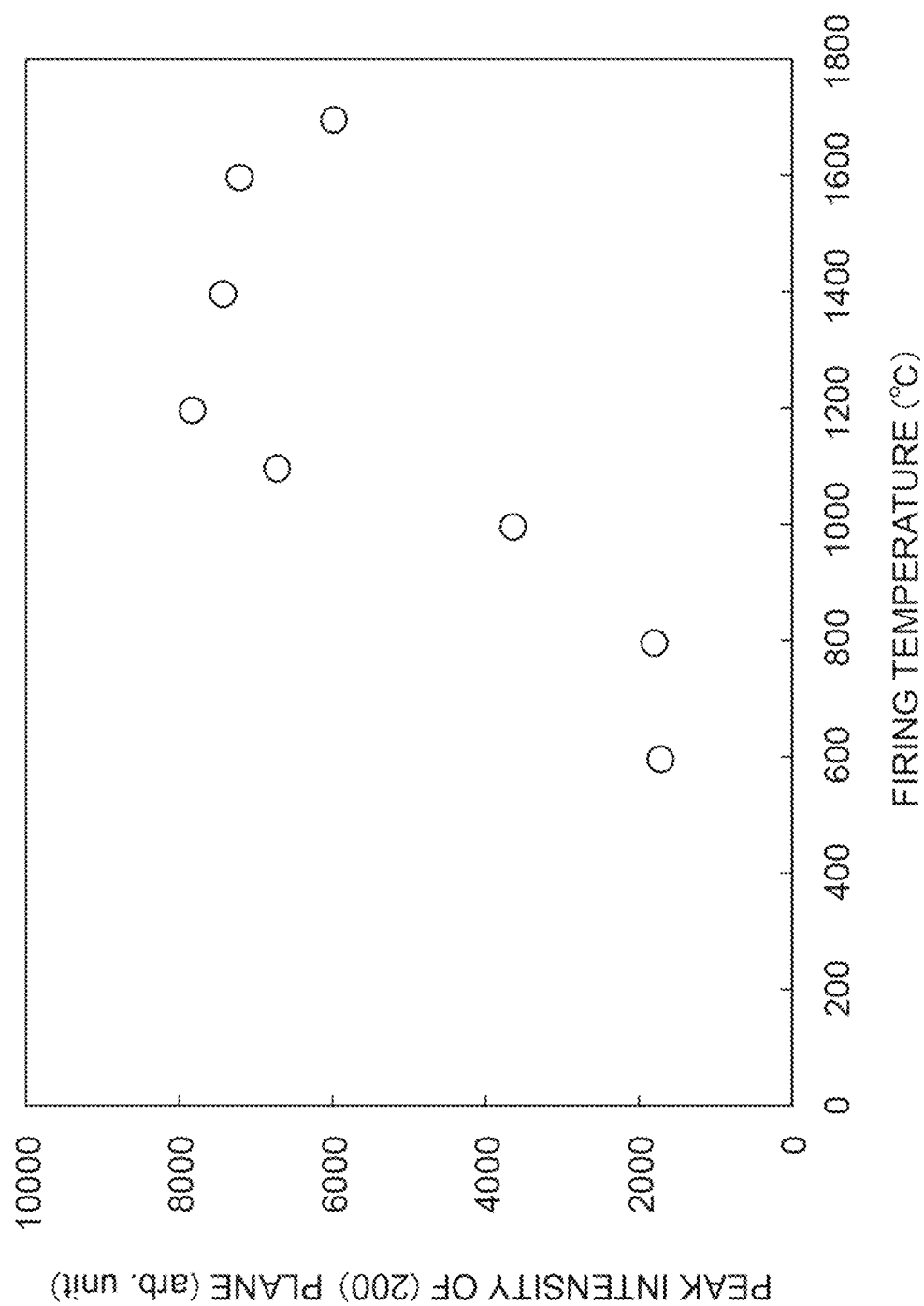
FIG. 14 is a graph showing a relationship between the firing temperature and the diffraction peak intensity of the <200> plane.

FIG. 13 is a graph showing the enlarged and superimposed diffraction intensity peak waveforms near the <200> plane (near 2θ/θ=26°) in the diffraction intensity waveforms at the firing temperatures shown in FIG. 12. Further, FIG. 14 is a graph showing a relationship between the firing temperature and the diffraction peak intensity of the <200> plane. Referring to FIG. 14, it can be seen that the diffraction peak intensity of the <200> plane gradually increases as the firing temperature becomes higher, but begins to saturate at the firing temperature of around 1100° C. and completely saturates at the firing temperature of around 1200° C.

Figure 15:
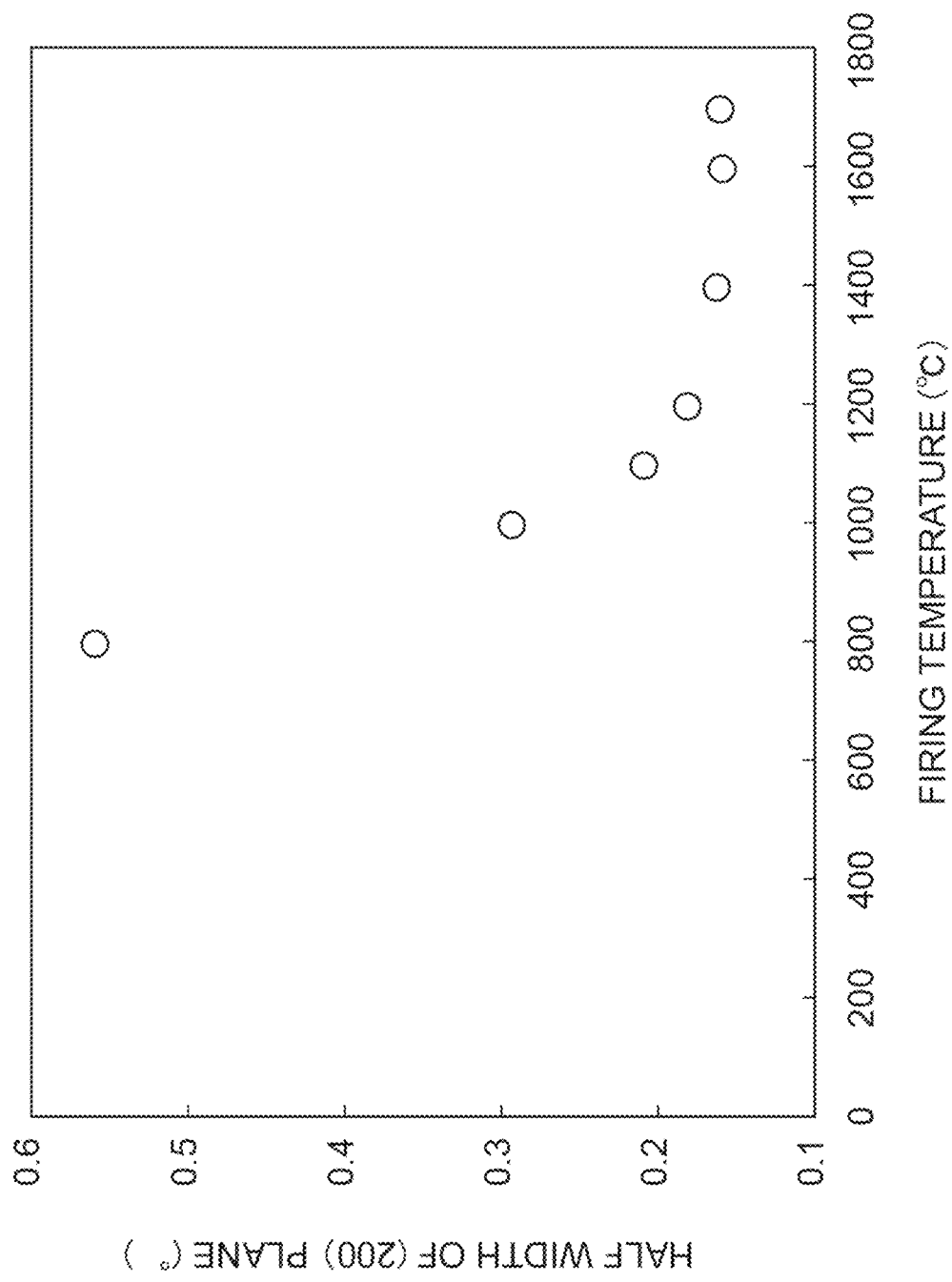
FIG. 15 is a graph showing a relationship between a half width of the diffraction intensity peak waveform corresponding to the <200> plane and the firing temperature.

Further, FIG. 15 is a graph showing a relationship between the half width of the diffraction intensity peak waveform corresponding to the <200> plane and the firing temperature. Further, FIG. 16 is a table showing numerical values on which FIG. 15 is based. Referring to FIG. 15 and FIG. 16, it can be seen that the half width of the diffraction intensity peak waveform of the <200> plane gradually narrows as the firing temperature becomes higher, but saturates at the firing temperature of around 1400° C. The half width at this time is about 0.16°. Further, referring to FIG. 15, it can be seen that the half width when the firing temperature is 1050° C. is 0.25° and the half width when the firing temperature is 1100° C. is about 0.2°.

The diffraction peak intensity changes depending on an irradiation condition such as an intensity of the X-ray and an irradiation time, but the half width of the diffraction intensity peak waveform does not depend on the irradiation condition of the X-ray since it is a qualitative value determined according to the crystallinity. That is, the firing temperature at the time of sample preparation can be replaced with the half width of the diffraction intensity peak waveform, and the firing temperature at the time of sample preparation can be known by measuring the half width of the diffraction intensity peak waveform. The half width of the diffraction intensity peak waveform of the <200> plane in the light emitting layer 22 described in the above embodiment corresponds to the firing temperature in the third step S13 at the time of the preparation of the light emitting layer 22.

SECOND EXAMPLE

Subsequently, a second example of the above-described embodiment will be described. The present inventors prepared a plurality of samples to which Bi is added in addition to Sc as the activator, and investigated their emission characteristics. In addition, the preparation method and the experimental apparatus are the same as those in the first example except that $Bi_2O_3$ is added to the material. In addition, the concentration of Sc contained in the components excluding P and O was set to 5 mol %, and the concentration of Bi was set to 0.5 mol %. Further, the firing temperatures of the samples were 1000° C., 1200° C., 1400° C., and 1600° C.

Figure 17:
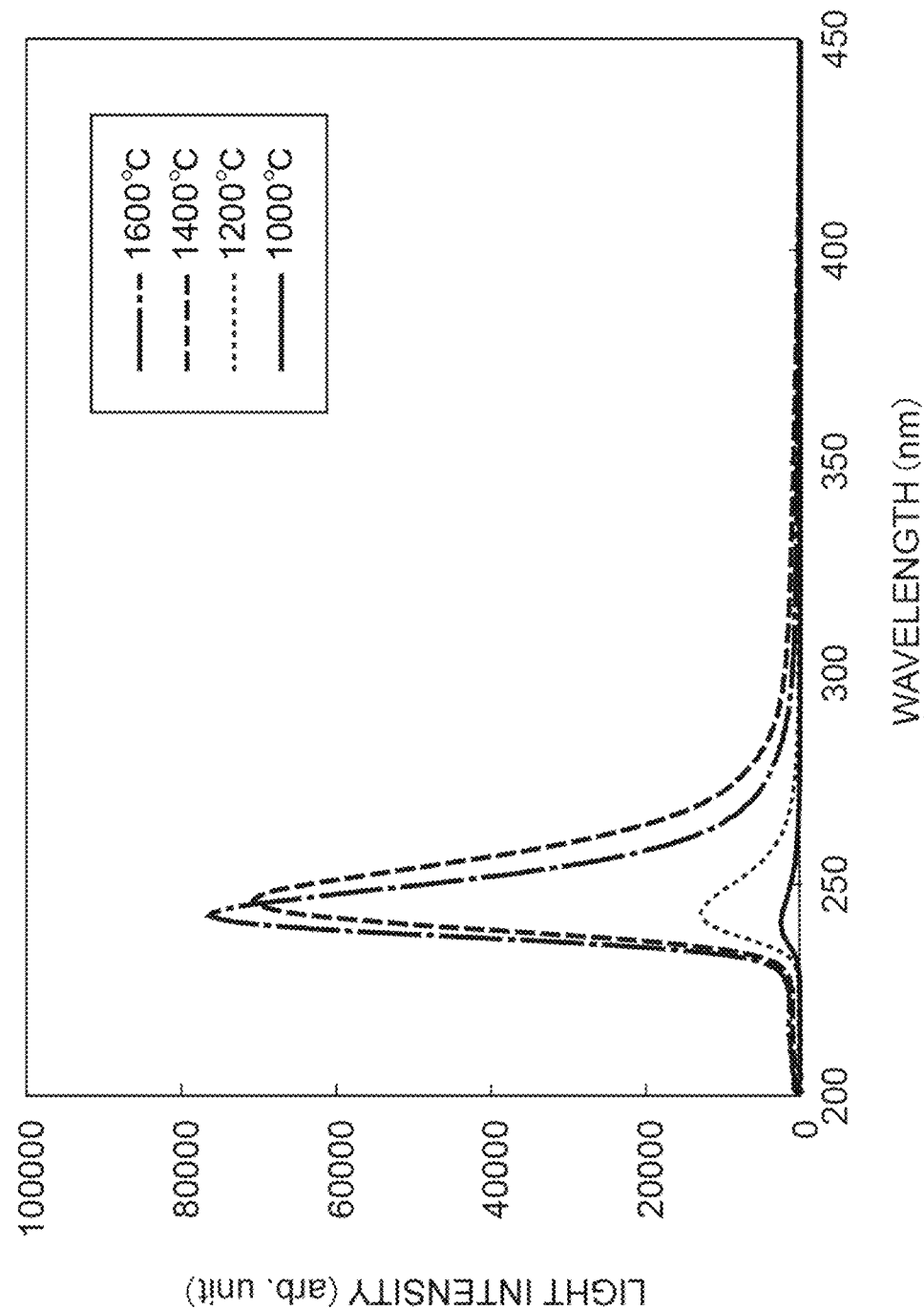
FIG. 17 is a graph showing emission spectra for firing temperatures obtained in a second example.

FIG. 17 is a graph showing emission spectra for the firing temperatures obtained in the present example. Referring to FIG. 17, it can be seen that the sample emits the ultraviolet light having a wavelength near 240 nm even when Bi is added. Further, it can be seen that as the firing temperature becomes higher, the emission intensity increases, and thus, the maximum emission intensity is obtained at 1600° C.

THIRD EXAMPLE

Next, a third example of the above-described embodiment will be described. The present inventors actually prepared a plurality of samples ($Sc:YPO_4$) as the light emitting layer 22 by using each of the liquid phase method and the solid phase method.

<Preparation by Liquid Phase Method>

In order to prepare 2 grains of 5 mol % Sc: $YPO_4$, 0.038 grams of $Sc_2O_3$ powder and 1.181 grams of $Y_2O_3$ powder were weighed. A mixture was prepared by mixing these materials in $H_3PO_4$ (liquid). Thereafter, the mixture was fired by heating the mixture in an electric furnace (1600° C. in the air).

<Preparation by Solid Phase Method>

In order to prepare 2 grams of 5 mol % Sc:$YPO_4$, 0.038 grams of $Sc_2O_3$ powder, 1.181 grams of $Y_2O_3$ powder, and 1.266 grams of $NH_4H_2PO_4$ powder were weighed. A mixture was prepared by mixing these materials, and then the mixture was fired by heating the mixture in an electric furnace (1600° C. in the air).

Figure 18:
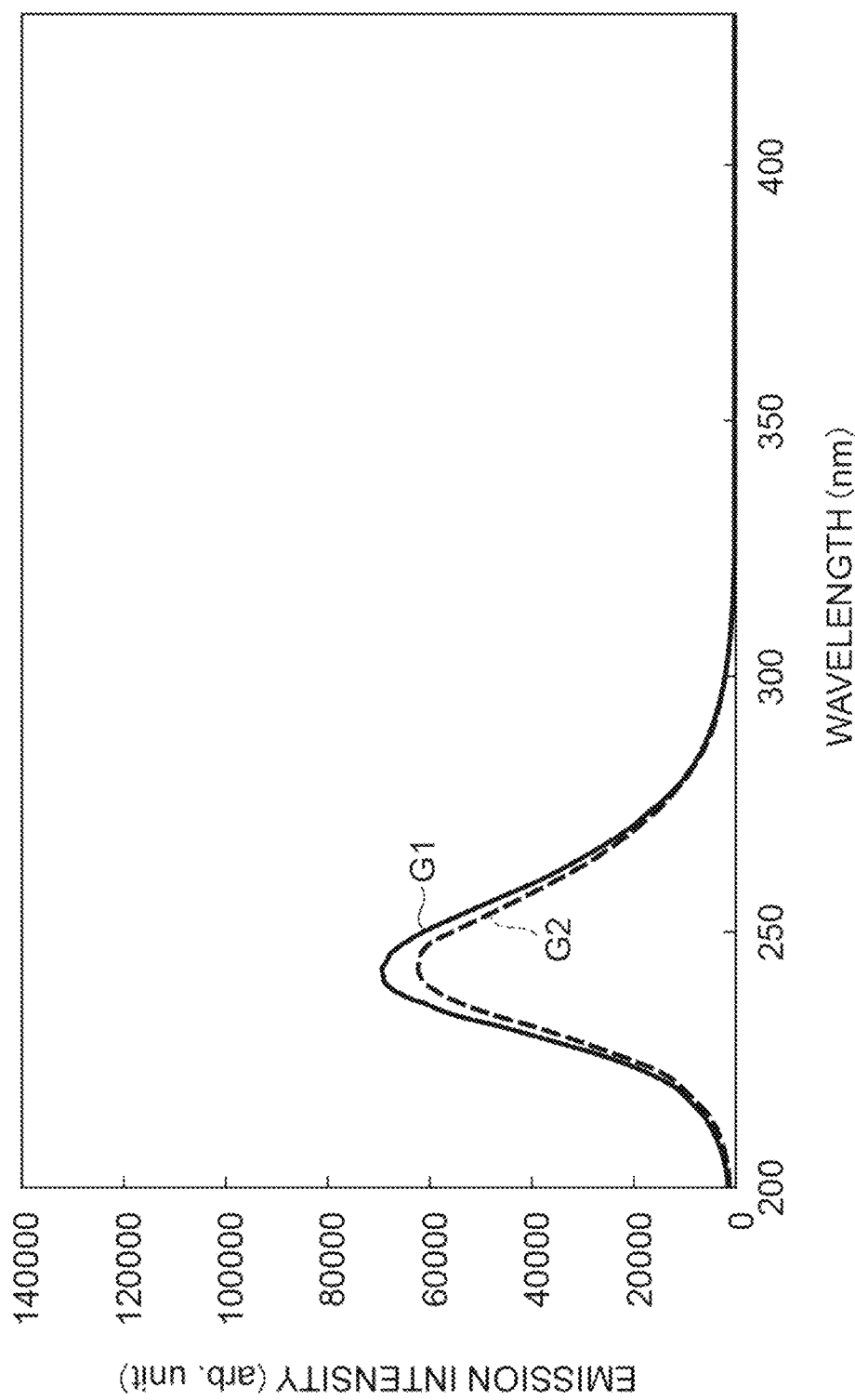
FIG. 18 is a graph showing measurement results obtained by applying samples prepared by using a liquid phase method and a solid phase method in a film form on a quartz substrate, irradiating the samples with an electron beam, and measuring emission spectra.

Subsequently, samples prepared by using the liquid phase method and the solid phase method were applied as a film form on a quartz substrate, the samples were irradiated with an electron beam, and emission spectra were measured. FIG. 18 is a graph showing measurement results. In this graph, a graph G1 shows the result by the liquid phase method, and a graph G2 shows the result by the solid phase method. As represented in this graph, the peak value of the emission intensity and the total emission amount in the liquid phase method were larger than those in the solid phase method.

The ultraviolet light generation target, the manufacturing method thereof, and the electron beam excited ultraviolet light source according to the present invention are not limited to the above embodiment and configuration examples, and can be variously modified.

The ultraviolet light generation target of the above embodiment includes a light emitting portion containing a $YPO_4$ crystal to which at least scandium (Sc) is added, and for receiving an electron beam to generate ultraviolet light.

According to the experiments by the present inventors, when the light emitting portion having the above composition is irradiated with the electron beam, the ultraviolet light having a wavelength near 240 nm can be excited. Accordingly, it is possible to provide the ultraviolet light generation target containing the useful light emitting material for electron beam excitation different from $Sc:Al_2O_3$.

In the above ultraviolet light generation target, bismuth (Bi) may be further added to the $YPO_4$ crystal. In this case, the ultraviolet light can also be effectively excited by irradiating the light emitting portion with the electron beam.

In the above ultraviolet light generation target, a molar composition ratio of Sc contained in components excluding P and O may be 0.02 or more and 0.6 or less. According to the experiments by the present inventors, when the concentration of Sc is within the above range, the emission intensity of the ultraviolet light can be remarkably increased.

In the above ultraviolet light generation target, a half width of a diffraction intensity peak waveform of a <200> plane of the light emitting portion measured by an X-ray diffractometer using CuKα rays may be 0.25° or less. According to the experiments by the present inventors, in this case, the emission intensity of the ultraviolet light can be remarkably increased.

The ultraviolet light generation target manufacturing method of the above embodiment is a method of manufacturing the ultraviolet light generation target having the above configuration, and includes a first step of preparing a mixture containing yttrium (Y) oxide, scandium (Sc) oxide, phosphoric acid or a phosphoric acid compound, and a liquid, a second step of evaporating the liquid, and a third step of firing the mixture.

According to the above manufacturing method, the light emitting portion of the above ultraviolet light generation target can be preferably prepared. In addition, according to the experiments by the present inventors, the emission intensity of the ultraviolet light can be further increased compared to a method (solid phase method) of simply mixing and firing powders of the Y oxide, the Sc oxide, and the phosphoric acid (or the phosphoric acid compound) by such a liquid phase method (also referred to as a solution method).

In the above manufacturing method, in the first step, the mixture further containing bismuth (Bi) oxide may be prepared. In this case, the ultraviolet light can also be effectively excited by irradiating the light emitting portion with the electron beam.

In the above manufacturing method, in the first step, a mixing ratio of the Sc oxide excluding the phosphoric acid and the phosphoric acid compound may be 1.2 mass % or more and 47.8 mass % or less. According to the experiments by the present inventors, when Sc has the above mixing ratio, the emission intensity of the ultraviolet light can be remarkably increased.

In the above manufacturing method, in the third step, a firing temperature may be set to 1050° C. or higher. According to the experiments by the present inventors, in this case, the emission intensity of the ultraviolet light can be remarkably increased.

The electron beam excited ultraviolet light source of the above embodiment includes the ultraviolet light generation target having the above configuration, and an electron source for irradiating the light emitting portion with the electron beam.

According to the above electron beam excited ultraviolet light source, it is possible to provide an ultraviolet light source containing a useful light emitting material for electron beam excitation different from $Sc:Al_2O_3$ by providing the ultraviolet light generation target having the above configuration.

INDUSTRIAL APPLICABILITY

The present invention can be used as an ultraviolet light generation target containing a useful light emitting material for electron beam excitation different from $Sc:Al_2O_3$, a manufacturing method thereof, and an electron beam excited ultraviolet light source.

REFERENCE SIGNS LIST

10—electron beam excited ultraviolet light source, 11—container, 12—electron source, 13—extraction electrode, 16—power supply unit, 20—ultraviolet light generation target, 21—substrate, 21a—principal surface, 21b—rear surface, 22—light emitting layer, 24—light reflection film, 30—apparatus, 31—vacuum container, 32—electron source, 33—observation window, 34—quartz substrate, 35—sample, 36—optical fiber, 37—spectroscopic detector, EB—electron beam, UV—ultraviolet light.

The invention claimed is:

1. An ultraviolet light generation target comprising:
   a light emitting portion containing a $YPO_4$ crystal to which at least scandium (Sc) is added, and configured to receive an electron beam to generate ultraviolet light.

2. The ultraviolet light generation target according to claim 1, wherein bismuth (Bi) is further added to the $YPO_4$ crystal.

3. The ultraviolet light generation target according to claim 1, wherein a molar composition ratio of Sc contained in components excluding P and O is 0.02 or more and 0.6 or less.

4. The ultraviolet light generation target according to claim 1, wherein a half width of a diffraction intensity peak waveform of a <200> plane of the light emitting portion measured by an X-ray diffractometer using CuKα rays is 0.25° or less.

5. An ultraviolet light generation target manufacturing method of manufacturing the ultraviolet light generation target according to claim 1, the method comprising:
   preparing a mixture containing yttrium (Y) oxide, scandium (Sc) oxide, phosphoric acid or a phosphoric acid compound, and a liquid;
   evaporating the liquid; and
   firing the mixture.

6. The ultraviolet light generation target manufacturing method according to claim 5, wherein, in preparing the mixture, the mixture further containing bismuth (Bi) oxide is prepared.

7. The ultraviolet light generation target manufacturing method according to claim 5, wherein, in preparing the mixture, a mixing ratio of the Sc oxide excluding the phosphoric acid and the phosphoric acid compound is 1.2 mass % or more and 47.8 mass % or less.

8. The ultraviolet light generation target manufacturing method according to claim 5, wherein, in firing the mixture, a firing temperature is 1050° C. or higher.

9. An electron beam excited ultraviolet light source comprising:
   the ultraviolet light generation target according to claim 1; and an electron source configured to irradiate the light emitting portion with the electron beam.

\* \* \* \* \*